(12) United States Patent
Saito et al.

(10) Patent No.: US 11,125,715 B2
(45) Date of Patent: Sep. 21, 2021

(54) GAS SENSOR

(71) Applicant: DENSO CORPORATION, Kariya (JP)

(72) Inventors: Akira Saito, Kariya (JP); Kiyomi Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 384 days.

(21) Appl. No.: 16/316,767

(22) PCT Filed: May 15, 2017

(86) PCT No.: PCT/JP2017/018247
§ 371 (c)(1),
(2) Date: Jan. 10, 2019

(87) PCT Pub. No.: WO2018/012101
PCT Pub. Date: Jan. 18, 2018

(65) Prior Publication Data
US 2019/0317041 A1    Oct. 17, 2019

(30) Foreign Application Priority Data

Jul. 11, 2016   (JP) .............. JP2016-137122

(51) Int. Cl.
*G01N 27/407* (2006.01)
*G01N 27/409* (2006.01)
*G01N 27/406* (2006.01)

(52) U.S. Cl.
CPC ....... *G01N 27/409* (2013.01); *G01N 27/4067* (2013.01); *G01N 27/4072* (2013.01); *G01N 27/4075* (2013.01); *G01N 27/4077* (2013.01)

(58) Field of Classification Search
CPC .............. G01N 27/407; G01N 27/409; G01N 27/3075; G01N 27/4075
See application file for complete search history.

(56) References Cited

U.S. PATENT DOCUMENTS

| | | | |
|---|---|---|---|
| 4,372,824 A * | 2/1983 | Toda ................. | G01N 27/4075 204/427 |
| 4,477,487 A | 10/1984 | Kojima et al. | |
| 5,443,711 A * | 8/1995 | Kojima ............. | G01N 27/4075 204/426 |
| 5,948,225 A | 9/1999 | Katafuchi et al. | |

(Continued)

FOREIGN PATENT DOCUMENTS

| JP | 53-19889 | 2/1978 |
|---|---|---|
| JP | 53-29188 | 3/1978 |

(Continued)

*Primary Examiner* — Alexander S Noguerola
(74) *Attorney, Agent, or Firm* — Nixon & Vanderhye P.C.

(57) ABSTRACT

A sensor element of a gas sensor includes a solid electrolyte body which has oxygen-ion conductivity, a measuring electrode that is exposed to a measured gas, a reference gas electrode that is exposed to a reference gas, and a porous protection layer. The measuring electrode is mounted on an outer surface of the solid electrolyte body. The reference electrode is mounted on an inner surface of the solid electrolyte body. The protection layer covers a surface of the measuring electrode. A plurality of open portions are formed to penetrate through the measuring electrode. A part of the protection layer is joined to the solid electrolyte body, via the plurality of open portions.

7 Claims, 6 Drawing Sheets

(56) References Cited

U.S. PATENT DOCUMENTS

| | | |
|---|---|---|
| 6,544,586 B1 | 4/2003 | Atsumi et al. |
| 2002/0011411 A1 | 1/2002 | Katafuchi et al. |
| 2002/0160102 A1 | 10/2002 | Kozaki |
| 2009/0242401 A1* | 10/2009 | Horisaka .............. G01N 27/419 |
| | | 204/412 |
| 2013/0192988 A1 | 8/2013 | Shiono et al. |

FOREIGN PATENT DOCUMENTS

| | | |
|---|---|---|
| JP | 64-043752 | 2/1989 |
| JP | 2-310459 | 12/1990 |

* cited by examiner

GAS SENSOR

CROSS REFERENCE APPLICATION

This application is U.S. National Phase Application under U.S.C. 371 of the International PCT Application PCT/JP2017/018247, filed on May 15, 2017, and published as WO2018/012101 on Jan. 18, 2018. This application is based on and claims the benefit of priority from Japanese Application No. 2016-137122 filed on Jul. 11, 2016. The entire disclosure of the above application is incorporated herein by reference.

TECHNICAL FIELD

The present disclosure relates to gas sensor which includes an electrode provided on a solid electrolyte body and a protection layer.

RELATED ART

Sensor elements of gas sensors which are used to measure an oxygen concentration are equipped with a measuring electrode which provided on an outside of a cup-shaped solid electrolyte body and is exposed to a measured gas, and a reference electrode which is provided on an inside surface of the solid electrolyte body, and exposed to a reference gas. Additionally, the gas sensor detects an oxygen-ion current which is generated between the measured gas electrode and the reference gas electrode, according to a difference in the oxygen concentration between the measured gas and the reference gas. A surface of the measuring electrode is covered with a porous protection layer which protects the measuring electrode from toxic substances in the measured gas and moisture, for example.

Patent literature 1 discloses a gas sensor which has a plurality of convex portions formed on a part of a measuring electrode, among an outside surface of a solid electrolyte body, to enhance joining of the measuring electrode and a protection layer. With this particular gas sensor element, a portion of the measurement electrode and a portion of the protection layer are hooked onto concave portions which are formed between the convex portions. In doing so, an anchor effect of the protection layer provided on the surface of the measuring electrode is obtained.

CITATIONS

Patent Literature

Patent Literature 1: JP1999-230930A

BACKGROUND

However, when gas sensors are used for long periods of time, a sensor element is thus subjected to exposure to high temperature measured gas for long periods, which can cause progressed sintered particles of solid electrolytes and noble metals which configure a measuring electrode and a reference electrode of the sensor element. Such progression of crystallization is called thermal aggregation which is based on a contraction phenomenon of each particle due to heat. Specifically, the measuring electrode is an electrode onto which an oxygen decomposing reactions occur, for example, by contact of a measured gas with the measuring electrode. Once thermal aggregation occurs on the measuring electrode, there is a concern of changes in a measuring response of a gas concentration, due to changes in diffusion of the gas of the measuring electrode. Furthermore, once thermal aggregation occurs on the measuring electrode, there is also an issue of changes in an electrode activity of the measuring electrode and the reference electrode, for example. As a result, changing in a sensor output of the gas sensor also becomes a concern.

In this regard, the conventional gas sensor disclosed in the patent literature 1 has not considered such effects of thermal aggregation that occurs on the measuring electrode which in turn detrimentally effect the performance of the sensor output.

Therefore, in order to decrease the occurrence of such changes in the sensor output, there is room for further improvement. Additionally, conventional gas sensors are configured with a protection layer which is merely in contact with a surface of the measuring electrode. Therefore, further improvements are also needed so that the protection layer is not easily detached from the measuring electrode.

SUMMARY

The present disclosure aims to provide a gas sensor in which the changes in a sensor output are decreased, that is, occurs with difficulty, and detachment of a protection layer is effectively suppressed.

A first mode of the present disclosure is a gas sensor equipped with a sensor element which measures a gas concentration.

The sensor element includes
a solid electrolyte body which is formed, from an oxygen-ion conductive ceramic, in a tube shape provided with a bottom. The solid electrolyte body includes a tube portion and a closed portion which closes a tip end of the tube portion.

The sensor element also includes
a measuring electrode provided on at least an outer surface of the tube portion and is exposed to a measured gas;
a reference gas electrode which is provided on at least an inner surface of the tube portion and is exposed to a reference gas; and
a protection layer which is formed from a porous ceramic and covers a surface of the measuring electrode.

The measuring electrode has a plurality of opening portions that are formed on the measuring electrode to penetrate through the measuring electrode. A part of the protection layer is joined to the solid electrolyte body via the plurality of the opening portions.

Effect of Invention

The plurality of the opening portions are formed on the measuring electrode to penetrate through the measuring electrode. The part of the protection layer is therefore joined to the solid electrolyte body via the plurality of the opening portions. When the sensor element is exposed to high temperature gas for prolonged periods, the level of sintering of noble metals progresses and thermal aggregation on the measuring electrode occurs. Since the plurality of the opening portions are provided on the measuring electrode, in addition to the part of the protection layer that is also arranged on these plurality of the opening portions, a configuration in which the level of sintering of the noble metals on the measuring electrode is decreased can be obtained.

Furthermore, situations of thermal aggregation occurring on the measuring electrode may also be decreased.

Also, due to the decrease in the thermal aggregation occurring on the measuring electrode, changes in diffusion of gas onto the measuring electrode of the sensor element occurs with difficulty, when the gas sensor is used, and the changes in a measuring response of the gas concentration occurs with difficulty.

Furthermore, due to the decrease of thermal aggregation which occurs on the measuring electrode, changes in an electrode activity occur with difficulty and are therefore decreased for the measuring electrode and the reference electrode. As a result, changes in the sensor output of the gas sensor can also be reduced.

The part of the protection layer that is formed from the porous ceramic is joined to the solid electrolyte body via the plurality of the opening portions. Therefore joining of the protection layer and the solid electrolyte body is achieved, and according to this configuration, detachment of the protection layer from the measuring electrode can be decreased, that is, occurs with difficulty, compared to when a protection layer is joined to only the measuring electrode that is configured of a noble metal and a solid electrolyte body.

According to the gas sensor described above, changes in the sensor output are reduced, that is occur with difficulty, and detachment of the protection layer can be efficiently suppressed.

BRIEF DESCRIPTION OF DRAWINGS

The purpose of the present disclosure, and other purposes, features and advantages will become transparent with a detailed description hereafter, described with reference to the drawings. In the accompanying drawings.

EMBODIMENTS OF THE INVENTION

Hereafter, a gas sensor of a preferred embodiment will be described with reference to FIG. 1 to FIG. 7.

The gas sensor 10 of the present embodiment includes a sensor element 1 for measuring a gas concentration.

Figure 1:
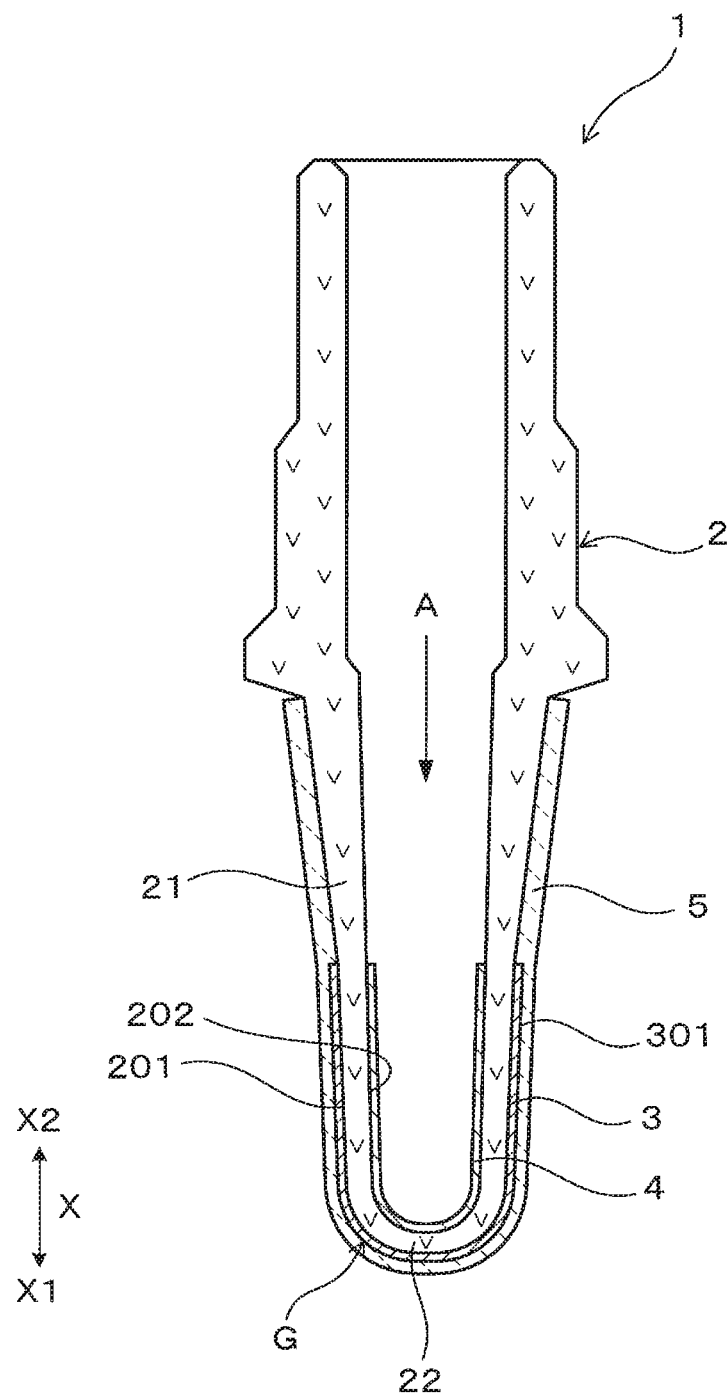
FIG. 1 is cross sectional view of a sensor element according to an embodiment.

As shown in FIG. 1, the sensor element 1 includes a solid electrolyte body 2 formed from a ceramic which has oxygen ion conductivity, a measuring electrode 3 which is exposed to a measured gas G, which is a gas to be measured, a reference electrode 4 which is exposed to a reference gas A and a protection layer 5 which is formed from a porous ceramic.

The solid electrode body 2 is a tube shape provided with a bottom (also referred to as cup shape) which is formed of a tube portion 21 and a closed portion 22 closing a tip end of the tube portion 21. The measuring electrode 3 is disposed around a whole circumference of the tube portion 21 of the solid electrolyte body 2 and an outer surface 201 of the closed portion 22. The reference electrode 4 is disposed around the whole circumference of the tube portion 21 of the solid electrolyte body 2 and an inner surface 202 of the closed portion 22.

Figure 2:
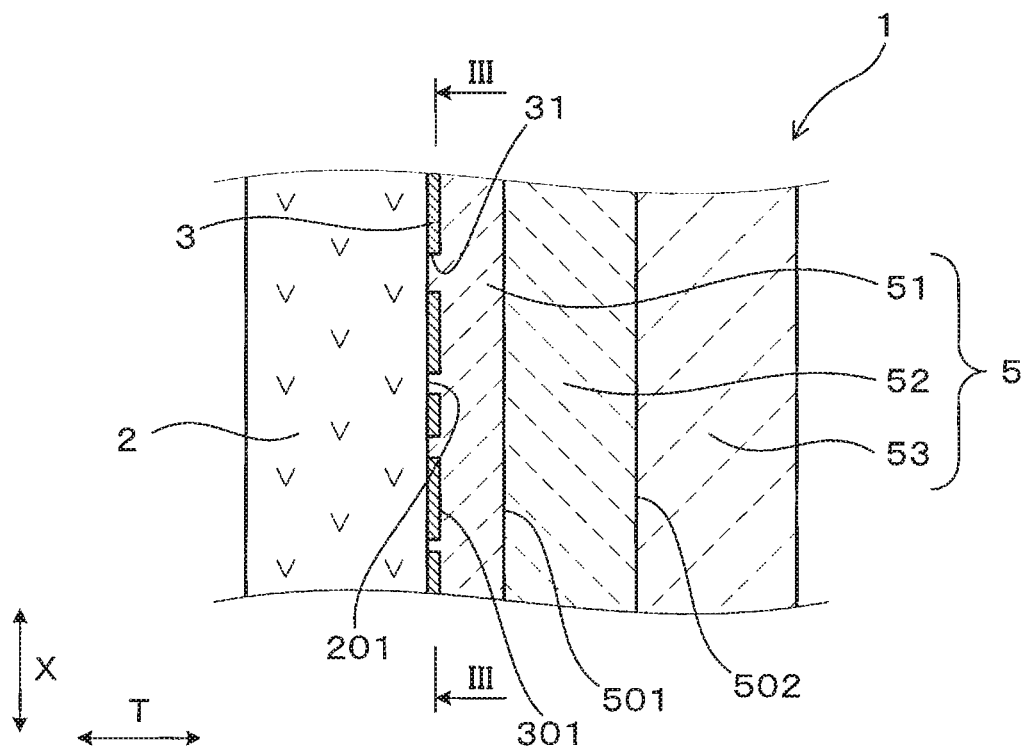
FIG. 2 is an enlarged view of an area of a measuring electrode shown in FIG. 1.

The protection layer 5 covers a surface 301 of the measuring electrode 3. As shown in FIG. 2, a plurality of opening portions 31 which penetrate though the measuring electrode 3 are formed on the measuring electrode 3. A part of the protection layer 5 is joined to the solid electrolyte body 2 via the plurality of holes 31. It is noted that the measuring electrode 3 may be provided around the whole circumference of only the outer surface 201 of the tube portion 21, and in contrast the measuring electrode 3 may be also provided around a whole circumference of only an inner surface 202 of the tube portion 21.

Next the gas sensor 10 according to the preferred embodiment is described.

The gas sensor 10 is mounted on an exhaust pipe of an engine, which is an internal combustion engine. An exhaust gas that passes through the exhaust pipe is the measured gas G, atmospheric air the reference gas A, and an oxygen concentration of the measured gas G is measured. The gas sensor 10 may be a concentration cell type gas sensor that measures electromotive power generated between the measuring electrode 3 and the reference electrode 4. In this case, the electromotive power is measured by a difference between the oxygen concentration in the measured gas G, in contact with the measuring electrode 3, and an oxygen concentration in a reference gas A, in contact with the reference electrode 4. Additionally, the gas sensor 10 may be a limiting current-type gas sensor measuring a current which flows between the measuring electrode 3 and the reference electrode 4, when a voltage is applied between the measuring electrode 3 and the reference electrode 4. In this case, the current is used measured by the difference between the oxygen concentration in the measured gas G, in contact with the measuring electrode 3, and an oxygen concentration in a reference gas A, in contact with the reference electrode 4.

The gas sensor 10 may also be used as an air/fuel ratio sensor (A/F sensor) or a lambda $\lambda$ sensor, for example.

In the preferred embodiment, a longitudinal direction of the sensor element 1 is shown as axial direction X of the gas sensor 10. Additionally, a side of the sensor element 1 into which the measured gas is introduced is given as a tip end X1, and a side which opposes the tip end X1 is given as a base end X2.

Figure 5:
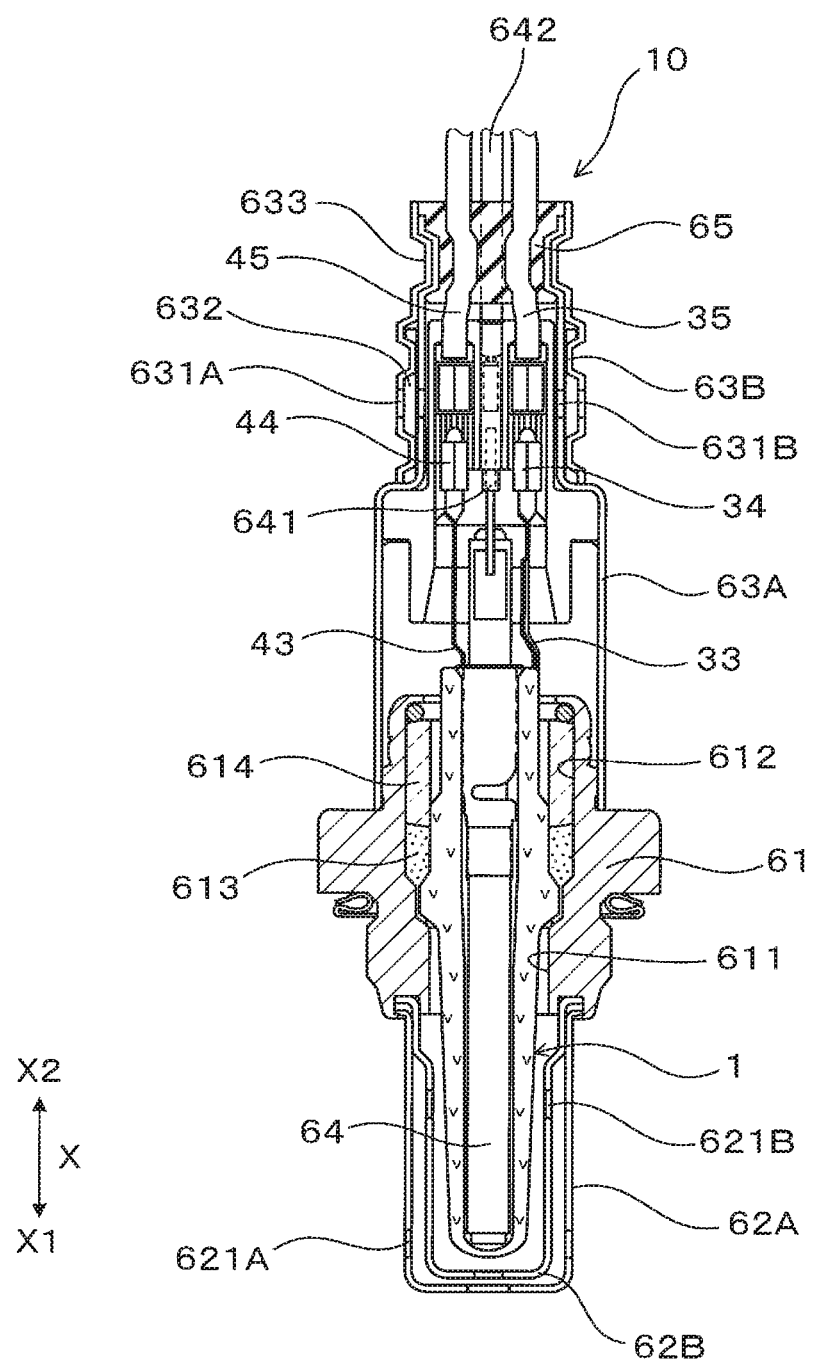
FIG. 5 is a cross sectional view of a gas sensor according to the embodiment.

As shown in FIG. 5, in addition to the sensor element 1, the gas sensor 10 also includes a metallic tube-shaped housing 61, measured gas-side covers 62A and 62B provided at the tip end X1 of the housing 61, and reference gas-side covers 63A and 63B provided at a base end X2 of the housing 61. In a center part of the housing 61, an insertion through hole 611 is formed for the insertion of the sensor element 1, and at the base end X2 of the insertion hole 611 a filling hole 612 is formed. A filler 613 that is made from a powder filling material to support the sensor element 1, for example, talc, and a porcelain insulator 614 for insulation of the sensor element 1 and housing 61 are arranged in the filling hole 612.

The measured gas-side covers 62A and 62B are provided to protect the tip end X1 of the sensor element 1, and inlet holes 621A and 621B are provided on the respective measured gas-side covers 62A and 62B to introduce the measured gas G into sensor element 1. The measured gas G is introduced into the outer surface 201 of the sensor element 1 (solid electrolyte body 2) from the inlet holes 621A and 621B. Incidentally, the inlet holes 631A and 631B are provided respectively on the reference gas-side covers 63A and 63B to introduce the reference gas A into the sensor element 1. Furthermore, a water repellent filter 632 is provided between the inlet holes 631A and 631B to prevent moisture in the reference gas from penetrating through. The reference gas A is introduced from the inlet hole 631A, and passes through the water repellent filter 632, and then through the inlet hole 631B, and is introduced to the inner surface 202 of the sensor element 1.

A rod shaped heater 64 that is heated by electricity is inserted inside the solid electrolyte body 2 to activate the solid electrolyte body 2. The base end X2 of the heater 64 is connected to a controller, which is an external controller of the gas sensor 10, by a connection terminal 641 and a lead 642. An elastic insulation member 65 is provided on an inner periphery of a base end part 633 of the reference gas-side covers 63A and 63B, to seal off atmospheric air and an inner area of the reference gas covers 63A and 63B.

The solid electrolyte body 2 is formed of solid electrolyte that has oxygen-ion conductivity, and the solid electrolyte is a ceramic metal oxide substance. The solid electrolyte body 2 has features for conduction of oxygen-ion at a predetermined temperature. The solid electrolyte body 2 of the preferred embodiment is formed of yttria-partially stabilized zirconia It is noted that a stabilized zirconia partially substituted with rare earth metal elements or alkaline earth metal elements, or a partially stabilized zirconia can be used for the solid electrolyte body 2.

Figure 4:
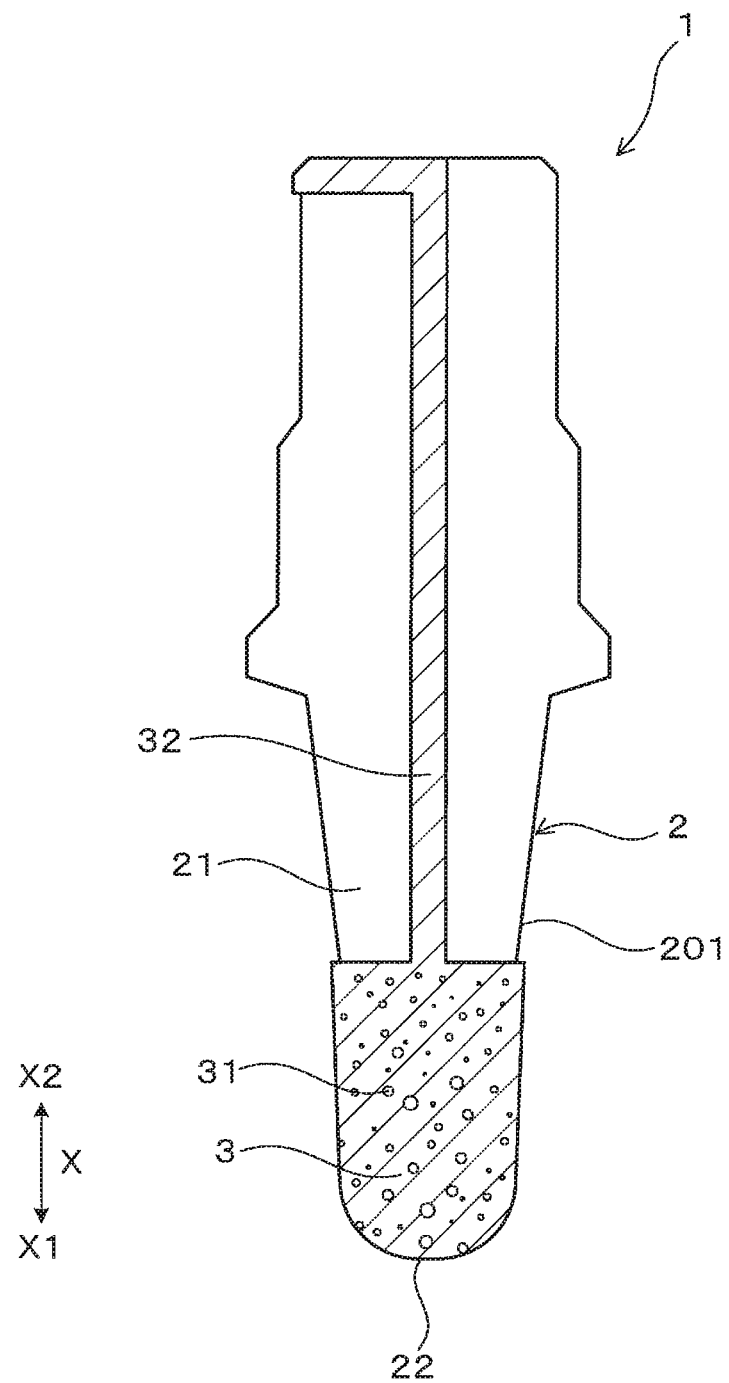
FIG. 4 is a front view of the sensor element according to the embodiment.

The measuring electrode 3 and the reference electrode 4 contains 50% or more of at least one metal among; Pt (platinum), Rh (rhodium), Pd (palladium), W (tungsten) and Mo (molybdenum). The measuring electrode 3 and the reference electrode 4 are provided in opposing positions from each other with the solid electrolyte body 2 intervening therebetween. As shown in FIG. 4, a lead portion 32 is formed on a section of the base end X2 on the outer surface 201 of the solid electrolyte body 2. The lead portion 32 is connected to an end part of the base end X2 of the measuring electrode. Another lead portion (omitted from the Figs) is also formed on the section of the base end of the inner surface 202 of the solid electrolyte body 2. This lead section is connected to another end of the base end X2 of the measuring electrode.

The measuring electrode 3 is formed on top of the solid electrolyte body 2 from electroless plating. Specifically, the electroless plated measuring electrode 3 is formed by adhering noble metal particles to the surface of the solid electrolyte body, by a pre-coating process, for example, whereby the noble metal particles are a metal membrane as an activation point. The noble metals form a nucleus of the measuring electrode 3. The opening portions 31 on the measuring electrode 3 are formed by providing area points in which the noble metal particles are not adhered, in a plurality of areas, of an adhesion range of the noble metal particles. The open portions 31 are formed in this way when the noble metal particles are adhered to the surface of the solid electrolyte body 2. The adhesion range of the noble metal particles is a range onto which the noble metal particles are adhered thereto.

More specifically, the measuring electrode 3 is formed from a paste which has the noble metal particles dispersed in a solvent. In this paste, a solid which is namely a pore-forming agent is dispersed. The pore-forming agent is formed from carbon which is sintered or decomposed by heat treatment, or an organic high molecular weight material, for example. Additionally, after the paste is coated onto the surface of the solid electrolyte body 2, the pore forming agent is burned or decomposed when the solid electrolyte body 2 is heated, and the opening portions 31 are thus formed in positions on which the pore-forming agent is previously placed.

The lead portion 32 of the measuring electrode 3 and the lead portion of the reference electrode 4 are provided on a part of the solid electrolyte body 2 in a circumferential direction. Incidentally, the opening portions 31 are not formed on the lead portion 32 of the measuring electrode 3 and the lead portion of the reference electrode 4 so that a resistance value is not increased. As shown in FIG. 5, the lead portion 32 of the measuring electrode 3 and the lead portion of the reference electrode 4 are connected to the controller apparatus that is disposed external to the gas sensor 10, by terminal electrodes 33 and 43, connection terminals 34 and 44 and leads 35 and 45.

The protection layer 5 is formed as a plurality of layers from a porous metal oxide. As shown in FIG. 2, in the preferred embodiment the protection layer is configured of a first protection layer 51 which covers the surface 301 of the measuring electrode 3, a second protection layer 52 which covers a surface 501 of the first protection layer, and a third protection layer 53 which covers a surface 502 of the second protection layer 52.

The first protection layer 51 is formed as diffusion resistance layers which guide the measured gas G to the measuring electrode 3, and then allow the gas to penetrate through the measuring electrode 3 at a predetermined diffusion velocity. The respective first protection layer 51, second protection layer 52 and third protection layer 53 have characteristics of not allowing toxic substances contained in the measured gas to pass through to the measuring electrode. The toxic substances include sulfur which reduces an electrode activity of the measuring electrode 3 due to adherence of the sulfur on the measuring electrode 3, toxic substances such as phosphor, and glass formed toxic substances which close off an open pore of the protection layer 5. It is noted that the protection layer 5 may also be formed in the form of one layer.

The first protection layer 51 is formed of a metal oxide substance which has, as main substance, at least one of alumina ($Al_2O_3$) and magnesium aluminate spinel ($MgAl_2O_4$). The second protection layer 52 is formed of a metal oxide substance which has, as a main substance, at least one metal among alumina, magnesium aluminate spinel, zirconia, a partially stabilized zirconia and stable zirconia, and at least one noble metal catalyst among Pt, Rh, Pd and Ru (ruthenium). The third protection layer 53 is formed of a metal oxide which has at least one type of metal among alumina, magnesium aluminate spinel, and titania, as a main substance. It is noted that a configuration of the protection layer 5 can be selected according to an environment in which the gas sensor 10 is mounted, and is not specifically limited to the three layers.

A part of the protection layer is continuously buried in the opening portions 31 from the surface 301 of the measuring electrode 3 to the outer surface 201 of the solid electrolyte body 2. Additionally, the metal oxide configuring the first protection layer 51 and the metal oxide configuring the solid electrolyte body 2 are joined to each other. The joining between the metal oxides mentioned here is a joining force due to an anchor effect, which is mainly a physical joining of an interface between the metal oxides. However depending on the material which is selected a chemical joining also occurs. A difference in linear expansion coefficient of the metals oxides which form the respective first protection layer 51 and solid electrolyte body 2 is 2 ppm/K or less.

The difference in the linear expansion co-efficient between the metals oxides forming the respective first protection layer 51 and solid electrolyte body 2 is smaller than a difference in a linear expansion coefficient between the metal oxide which forms the first protection layer 51 and the electrode material which forms the measuring electrode 3. Generally, when different materials are heated at high temperatures, the larger the linear expansion coefficient is the larger an amount of expansion. For this reason, when there is a large difference in the linear expansion coefficient between materials which are in contact with each other, an expansion volume of one material is smaller than an expansion volume of another material, at an interface of both materials. For this reason, since thermal stress at the interface between both materials occurs, detachment easily occurs between materials that are in contact with each other.

The first protection layer 51 of the preferred embodiment is not only joined to the measuring electrode 3, but also joined to the solid electrolyte body 2. When the sensor element 1 is ether heated or cooled, thermal stress occurs at an interface between the first protection layer 51 and the measuring electrode 3. The thermal stress is due to the difference in the linear expansion co-efficient between the metal oxide substance which forms the first protection layer 51 and the linear expansion co-efficient of the noble metal and the metal oxide substance which forms the measuring electrode 3. Therefore, when the first protection layer 51 and the measuring electrode 3 are merely joined to each other, the first protection layer 51 is subjected to a state of easily detaching from the measuring electrode 3.

In contrast, when the sensor element 1 is either heated or cooled, since the difference in the linear expansion co-efficient of the metal oxide which forms the first protection layer 51 and the metal oxide which forms the solid electrolyte body 2 is 2 ppm/K or less, thermal stress is almost non-existent at the interface between the first protection layer 51 and the solid electrolyte body 2. For this reason, the first protection layer 51 is not only joined to the measuring electrode 3 but also joined to the solid electrolyte body 2, thus, a state in which the protection layer 51 is detached with difficulty from the measuring electrode 3 is obtained.

Figure 3:
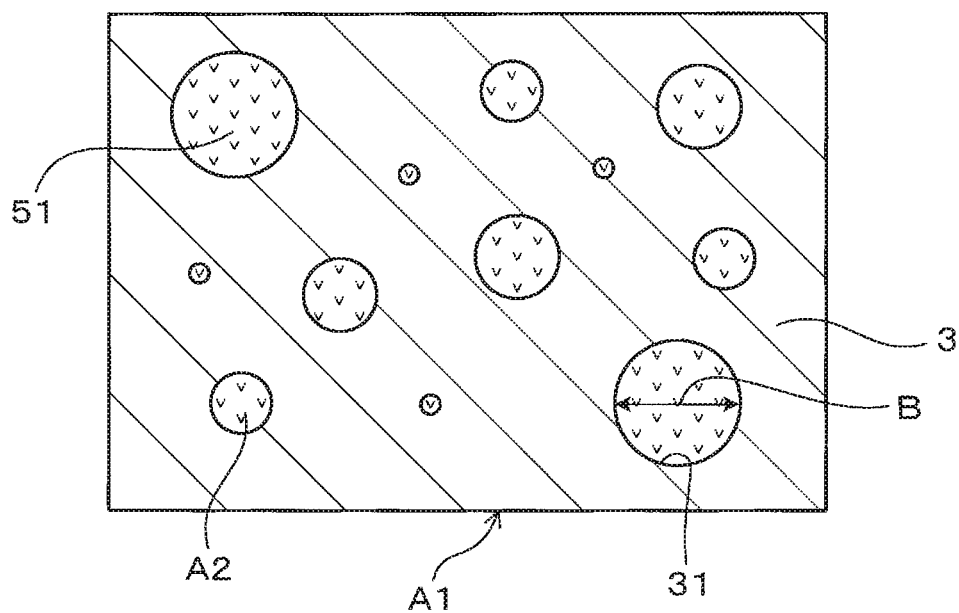
FIG. 3 is a cross sectional view along arrows of FIG. 2.

FIG. 2 schematically shows a cross section of a state of the plurality of opening portions 31 on the measuring electrode 3, and the first protection layer 51 arranged on the plurality of the opening portions. FIG. 3 schematically shows a flat view of the state of the plurality of opening portions 31 on the measuring electrode 3 and the protection layer 51 arranged on the plurality of opening portions 31.

As shown in FIG. 2, the plurality of opening portions 31 are formed to penetrate through the measuring electrode 3 in a thickness direction T of the measuring electrode 3. The plurality of opening portions 31 are formed to have various external appearances (sizes), and are irregularly distributed substantially all over the measuring electrode 3, as shown in FIG. 3. Also, a shape of the opening portions 31 is a shown as a circular shape, however, the opening portions 31 can also be oval shaped or a non-fixed shape.

According to the sensor element 1 of the preferred embodiment, a formed percentage of the opening portions 31 on the measuring electrode 3 is regulated. That is, an outer area A1 is given as a total outer area of the measuring electrode 3, when the measuring electrode 3 is projected on a flat plane, and an open area A2 is given as total area of the plurality of opening portions 31, when the opening portions are projected on a flat plane, as shown in FIG. 3. An open percentage A2/A1 is 5.0% or more and 30% or less, when A2 is the percentage of the outer area A1.

Since the solid electrolyte body 2 which is formed in the tube shape provided with a bottom includes a curved shape, the outer surface area A1 and the open surface area A2 are shown as a surface area when the measuring electrode 3 is opened and laid on a plane surface. That is, the measuring electrode is opened and laid on the plane surface, whilst maintaining the outer surface area A1 and the open surface area A2. In this case, the outer surface area A1 of the measuring electrode 3 excludes a surface area of the lead portion 32 and includes the open surface area A2 of the plurality of opening portions 31.

When concavities and convexities are formed on the surface 301 of the measuring electrode 3, a surface area is not increased in consideration of an increased height, as a result of the concave and convex portions, and the surface 301 of the measuring electrode 3 is shown as a surface area laid open on a two dimensional flat surface. The outer surface area A1 of the measuring electrode 3 when laid open on the flat surface, and the open surface area A2 of the plurality of opening portions 31 when laid open on the flat surface can be estimated by capturing images of the surface area 301 of the measuring electrode 3 using a camera, and processing of an image which is photographed.

An average diameter of the entire opening portions 31 is in a range of 10 μm or more and 150 μm or less. Each opening portion 31 is a circular shape, oval shape, or various shapes, for example. The diameter of the opening portion 31 is a length of the longest virtual straight line, assuming that a large number of virtual straight lines pass through an inside of the opening portion 31. The average diameter of the opening portion is an average value which is equivalent to a diameter of 100 opening portions 31 is a specific area range.

If the shape of the opening portion 31 include a sharp edge, a crack easily occurs due to thermal stress. Thus, the opening portions 31 desirably have a substantially circular shape. The opening portions 31 are desirably equally dispersed on the measuring electrode 3.

In a case where open percentage A2/A1 is less than 5%, or when an average outer length is less than 10 μm, a surface area of the part of the protection layer 51 which is buried in the opening portion 31 and is joined to the solid electrolyte body 2 is reduced. As a result, there is a concern that the detachment of the protection layer 51 from the measuring electrode 3 may not be effectively suppressed. In contrast, in a case where the open percentage A2/A1 exceeds 30.0%, or when the average outer length of the opening portion 31 exceeds 150 μm, it is considered that parts of the protection layer 51 which are buried in the opening portions 31 are continuously connected, and an electrical resistance value of the measuring electrode 3 thus increases. Furthermore, deterioration of a detection precision of the oxygen concentration, measured by the sensor element 1, becomes a concern.

The open percentage A2/A1 preferably satisfies a relation of 10.0% or more and 20.0% or less. In this case, the detachment of the first protection layer 51 from the measuring electrode 3 is suppressed and the detection precision of the oxygen concertation of the sensor element 1 can be further effectively maintained.

Figure 6:
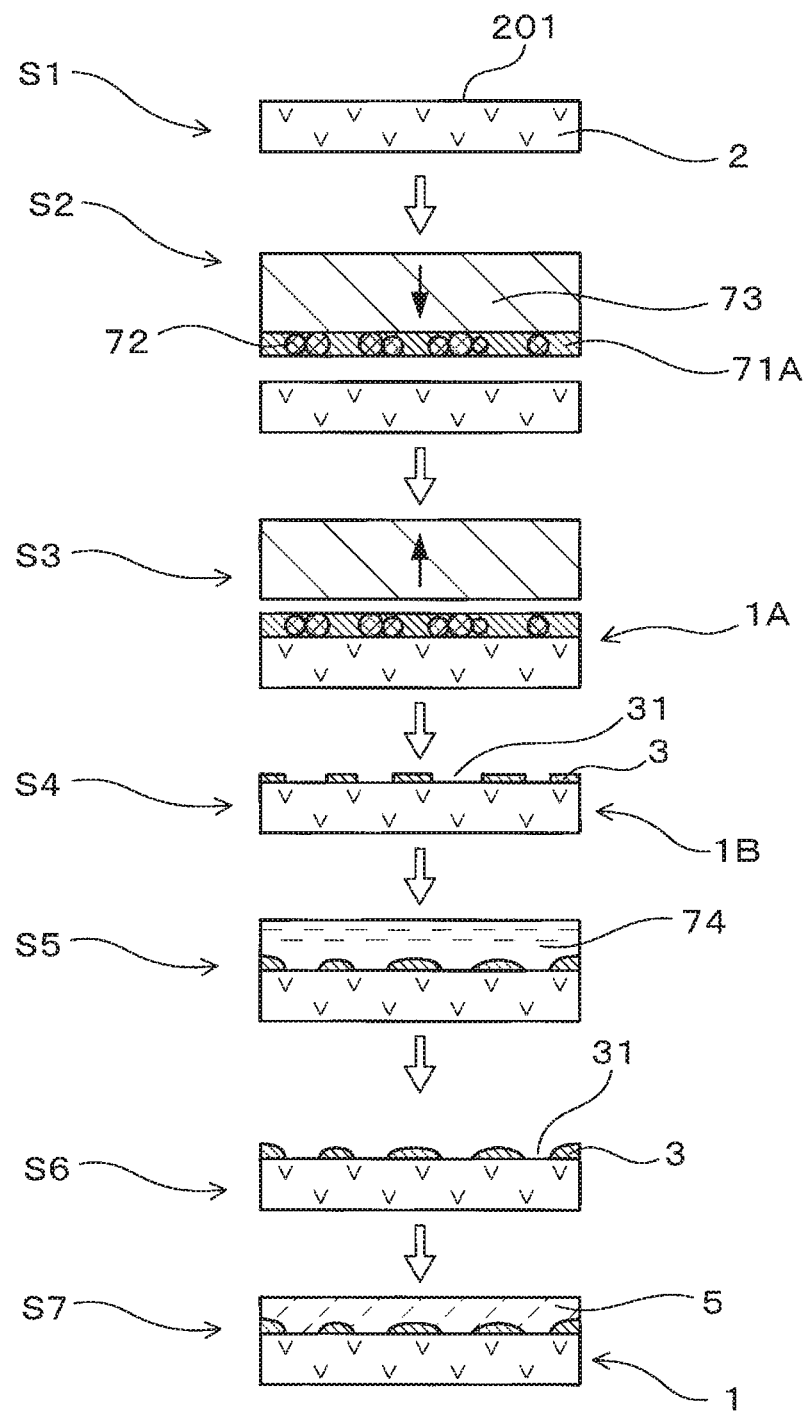
FIG. 6 is an explanatory view showing a state of manufacturing of the sensor element according to the embodiment.

Next, a manufacturing method of the sensor element 1 will be described with reference to FIG. 6. In the manufacturing of the sensor element 1, firstly, the solid electrode body 2 is produced at a manufacturing process S1. A mixed power of zirconia and yttria which is added at a predetermined amount is formed into a formed body of a tube shape provided with a bottom. The formed body is then sintered at a temperature of 1400 to 1600° C. and thus the solid electrode body 2 is produced. In the same figure, the solid electrolyte body 2 is simply shown as a flat plate, however, the solid electrolyte body 2 is actually formed into the tube shape which has a bottom.

Next, an electrode application processes S2 and S3 are performed to form the measuring electrode 3. This entails applying an electrode paste on the outer surface 201 of the solid electrode body 2 to form an intermediate 1A. The electrode paste 71 contains a solvent of water or an organic solvent, noble metal particles which have a final concentration of 0.1 to 1.0 mass %, relative to the total mass of the electrode paste 71, a binder formed of a resin, and a dispersing agent. A pore-forming agent 71 which is formed from an acrylic resin or/and carbon is added to the electrode paste 71 to form the opening portions 31. The electrode paste 71 which has the pore-forming agent 72 added thereto is then coated onto a print body 73, and the electrode paste 71 from the print body 73 and the pore-forming agent 72 are transferred onto the outer surface 201 of the solid electrolyte body 2. The transfer of the electrode paste 71 and the pore-forming body 72 can be performed by using a transfer roll, pad printing, Rotogravure printing, screen printing and a spray drying method, for example.

Organic solvents such as terpineol, alcohol, ethyl or aromatic hydrocarbon substances, for example, may be used as the organic solvent used in the electrode paste 71. However, terpineol is preferably used as the solvent, due to a binding solubility, printing and at a volatility at point of drying, for example. Binders which are used in the electrode paste 71 include ethyl cellulose, acrylic resin, polyvinyl alcohol, and polyvinyl butyral, for example. However, in view of a coating performance, and thermal decomposition at a point of dewaxing, ethyl cellulose is preferably used.

The binder has suitable viscosity characteristics in the electrode paste 71, and prevents disengagement between metal particles, and also disengagement of the noble metal particles from the solid electrode body 2, the binder is also burned away during a heating process. Once the pore-forming agent is used to form the opening portions 31, it is then burned away during the heating process. The open percentage A2/A1 of the opening portions 31 formed on the measuring electrode 3 can be adjusted according to a content of the pore-forming agent 72 contained in the electrode paste 71, a particle diameter of the pore-forming agent 72 or a coating thickness of the electrode paste 72 which is coated onto the outer surface 201 of the solid electrode body 2, for example.

Next, an electrode dewaxing process S4 is performed. In this process, the intermediate 1A is heated at 400 to 600° C. to burn and decompose the binder in the electrode paste 71 of the intermediate 1A. At this point, the pore-forming agent 72 in the electrode paste 71 is removed. The opening portions 31 are formed in parts where the pore-forming agent 72 is arranged, when the pore forming agent is applied to the electrode paste 71 that is coated onto the outer surface 201 of the solid electrolyte body 2. In this way, the opening portions 31 are widely distributed on a part of the measuring electrode 3, which is the nucleus of the measuring electrode 3, on the outer surface 201 of the solid electrolyte body 2.

Next, at an electrode plating step S5, an electroless plating process is performed by immersing an element intermediate body 1B in a plating solution 74 which includes a platinum analogue. The platinum complex is a noble metal component of the measuring electrode 3. At this point, the noble metal component in the plating solution is laminated onto the nucleus of the measuring electrode, and the measuring electrode 3 which has a plurality of opening portions 31 and which has a sufficient thickness is thus formed. Also, an electrode sintering process S6 is performed by sintering the measuring electrode at 1200° C. for one hour. The measuring electrode is thus compactly sintered and thermal aggregation on the sensor is prevented in an environment where the measuring electrode is used.

The electrode coating processes S2 and S3 are also performed as described above, using an electrode paste to which the pore-forming agent is not added, after which, the respective electrode drying process S4, the electroless plating process S5 and the electrode sintering process are performed. The reference electrode 4 is thus provided on the inner surface 202 of the solid electrolyte body 2.

A thermal spray process S7 includes thermal spraying of a slurry formed of a metal oxide, for example, alumina. The slurry is thermally sprayed to form the first protection layer 51, the second protection layer 52 and the third protection layer 53, as the protection layer 5, one after the other, on the surface of the measuring electrode 3 on the element intermediate body 1B. In this way, the measuring electrode 3 and the reference electrode 4 are respectively formed on the solid electrolyte body 2, and the sensor element 1 which is provided with the measuring electrode 3 covered with the protection layer 5 is thus formed.

It is noted that the protection layer 5 may be alternatively formed by immersion of the element intermediate body 1B into a slurry as opposed to thermally spraying the slurry.

It is noted that the measuring electrode 3 configured with the opening portions 31 formed thereon can also be produced without performing the electroless plating method. In this case, a concentration of the noble metal particles in the electrode paste 71 is increased at the electrode coating steps S2 and S3, and coating this electrode paste 71 onto the outer surface 201 of the solid electrolyte body 2 can form the measuring electrode 3.

Next a working effect of the gas sensor 10 according to the first embodiment will be described.

The sensor element 1 of the gas sensor 10 according to the first embodiment is provided with the measuring electrode 3 which has the plurality of opening portion 31 formed to penetrate through the thickness direction T of the measuring electrode 3. The parts of the protection layer 51 are therefore joined to the solid electrolyte body 2 via the plurality of opening portions 31. When the sensor element 1 is exposed to the measured gas at high temperatures for long periods, sintered levels of the noble metal of the measuring electrode 3 and the particles of the solid electrolyte progresses, and thermal aggregation on the measuring electrode tends to occur. However, since the plurality of opening portions 31 are provided on the measuring electrode 3, in addition to arranging the parts of the protection layer 51 on the plurality of opening portions 31, the noble metal of the measuring electrode 3 is formed such that sintering occurs with difficulty.

As a further result, a configuration in which thermal aggregation on the measuring electrode 3 occurs with difficulty and is thus reduced can be obtained.

Additionally, since the thermal aggregation on the measuring electrode 3 occurs with difficulty, changes of gas diffusion on the measuring electrode of the sensor element 1 are decreased, and also changes in a response to the measured gas concentration are also decreased. Since the thermal aggregation on the measuring electrode 3 occurs with difficulty, changes in the electrode activity of the measuring electrode 3 and the reference are reduced. As a result, changes in a sensor output of the gas senor 10 also occurs with difficulty and can be therefore reduced.

Incidentally, according to the configuration, the protection layer 5 is formed on the measuring electrode 3. Therefore in a case of thermal aggregation occurring on the measuring electrode 3, a joining performance of the protection layer 5 that is joined to the sensor element 1 via the measuring electrode 3 deteriorates. However, according to the sensor element 1 of the present embodiment, the protection layer 5 is not only joined to the surface 301 of the measuring electrode 3, but also joined to the outer surface 201 of the solid electrolyte body 2 via the plurality of opening portions 31. As a result, a joined state of the protection layer 5 and the solid electrolyte body 2 form a state in which the metal oxide substances are joined to each other, therefore, a fixing potential of the protection layer 5 can be enhanced, compared to a configuration in which the protection layer 5 is only joined to the measuring electrode 3. As a further result, detachment of the protection layer from a gap (as an origin) formed on the measuring electrode can be effectively suppressed.

As described above, according to the sensor element 1 of the first embodiment, changes in the sensor output are decreased, that is occur with difficulty, and the detachment of the protection layer can be effectively suppressed.

Figure 7:
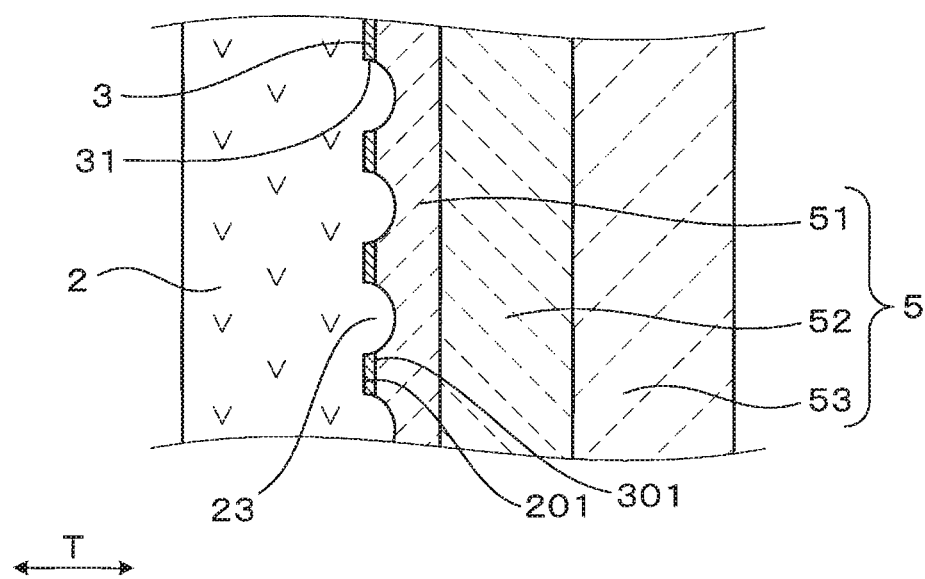
FIG. 7 is an enlarged cross sectional view of a measuring electrode area of another sensor element according to the embodiment.

As shown in FIG. 7, a large number of convex portions and concave portions are formed on the outer surface 201 of the solid electrolyte body 2. Among these convex portions and concave portions, convex portions 23 may be used to form the plurality of the opening portions 31 on the measuring electrode 3. That is, the convex portions 23 can be arranged inside the opening portions 31 of the measuring electrode 3, and the parts of the protection layer 51 can be in-contact with the convex portions 23 protruding through the opening portions 31 from the surface 301 of the measuring electrode 3. In such a configuration, the electrode paste 71 which has no pore-forming agent 72 contained is used. The measuring electrode 3 which is configured with the opening portions 31 can be formed by causing the electrode paste 71 adhered to the convex portions 23 to flow, using the print body 73, to flow from the convex portions 23.

(Confirmation Test)

In the confirmation test, a feature of the respective electrical resistance, sensor output, joining performance of a protection layer and continuous durability in high temperatures were measured in a plurality of samples 1 to 10 of the sensor elements 1, according to the first embodiment. The measuring electrodes 3 for the samples 1 to 10 were formed by using an electrode paste 71 which contained different percentages of the pore-forming agent 72.

The percentage of the opening surface area A2, referred to as the open percentage, is given as an open surface area percentage of a plurality of opening portions 31 which are provided on an outer surface area of the measuring electrodes 3, for the samples 1 to 10. The A2/A1 (surface percentage %) value is different for each of the samples 1 to 10, according to the contained percentage of the pore-forming agent 72. Results of each feature which was measured for samples 1 to 10 are shown in table 1.

TABLE 1

| S | PORE FORMING AGENT IN PASTE (MASS %) | OPEN % A2/A1 (AREA %) | ELECTRIC RESISTANCE | SENSOR OUTPUT | LAYER JOINING | H. TEMP. DURATION |
|---|---|---|---|---|---|---|
| 1 | 5.0 | 3.1 | E | G | G | P |
| 2 | 10.0 | 4.9 | E | G | G | G |
| 3 | 12.0 | 6.1 | E | G | G | G |
| 4 | 15.0 | 9.9 | E | E | E | E |
| 5 | 18.0 | 14.0 | E | E | E | E |
| 6 | 20.0 | 20.2 | E | E | E | E |
| 7 | 23.0 | 25.3 | G | G | E | E |
| 8 | 25.0 | 30.3 | G | G | E | E |
| 9 | 28.0 | 32.1 | P | G | E | E |
| 10 | 30.0 | 35.0 | P | P | E | E |

Electrical Resistance is an electrical resistance of a sensor.
H. Temp. Duration refers to a continuous high temperature duration.
E = Excellent, G = Good and P = Poor.

(Electrical Resistance)

A confirmation test for the electrical resistance was performed as an indicator, to test the compactness of the measuring electrode 3 formed on the solid electrolyte body 2. In this confirmation test, a resistance value of a surface on both ends of the measuring electrode 3 was measured for each sample of the sensor element 1 by employing the two terminal method using a multi-meter. The measuring electrode 3 was formed to have a surface are of 10 mm$^2$ and a thickness of 1 μm. The resistance value of the surface is desirably low. That is, the lower the value was the more desirable and the lower value indicated that the measuring electrode 3 is compact and thus thermal aggregation occurs with difficulty. A determination criteria is given as; 'excellent, E' for a surface resistance value which was less than 1Ω, 'Good, G' for a surface resistance value which was equal to or higher than 1Ω and less than 3Ω, and 'Poor, P, for a surface resistance value which exceeded 3Ω.

As shown in FIG. 1, the smaller the percentage of the open percentage A2/A1, the lower the surface resistance value is of the measuring electrode 3. When the percentage of the open percentage A2/A1 is 30.3% or less, the evaluation result was marked as 'Excellent, E' or 'Good, G'.

In contrast, the resistance value of the surface of the measuring electrode 3 markedly increased when the open percentage A2/A1 exceeded 30.3%, in which case the evaluation was determined as 'Poor, P'. It was thus found that in order to maintain the resistance value of surface at a low value, the open percentage A2/A1 is preferably 30.0% or less to have a margin of error.

(Characteristic of Sensor Out-Put)

A confirmation test of the sensor output was performed as indicator to test a potential evaluation of the gas sensor 10. In this confirmation test, each sample was heated until a tip of the front end X1 reached 350° C. The samples were heated by a heater 64 which was disposed at an inner side of each t sample of the sensor element 1. Additionally, once the temperature of the tip of the front end X1 of the sample was stable, a mixed rich gas of carbon monoxide, methane, propane and nitrogen was supplied to the gas sensors 10 provided with the sensor element samples 1, to provide an air/fuel ratio is 0.97. At this point, an output voltage between the measuring electrode 3 and the reference electrode 4 was measured as a sensor output. For the sensor output, the greater the value of the sensor output, the higher the sensitivity is for the measured gas G as the exhaust gas. That is, higher sensor output value enhances a measuring precision of the gas concentration for the gas sensor 1. In this case, a determination criteria is 'Excellent, E' for the output voltage which exceeds 0.75V, 'Good, G' for the output voltage which is 0.70 V or more and less than 0.75V, and 'Poor, P' for the output voltage which is less than 0.70V.

As shown in Table, 1, the sensor output is desirable when the open percentage A2/A1 is in a predetermined range. Specifically, when the open percentage A2/A1 is 32.1% or less the evaluation result is 'Excellent, E' or 'Good, G'. In contrast, when the open percentage A2/A1 exceeds 32.1%, the sensor output is markedly decreased and the evaluation result is 'Poor, P'. In view of the results described above, it was found that in order to maintain a desirable sensor output, the open percentage A2/A1 is preferably 32.1% or less.

(Joining Performance)

A confirmation test of the joining performance of the protection layer 5 was used as an indicator to test the joining performance of the protection layer 5 and the solid electrolyte body 2. In this confirmation test, after heating the sensor samples 1 provided with the protection layer 5 at 600° C. in atmospheric conditions, air cooling of the samples was repeatedly performed for a predetermined number of times. An adhesion tape was then adhered on the protection layer 5, and a tape detachment test in which the tape is rapidly pulled and detached from the protection layer was performed. At this point, it was determined whether the protection layer is detached. In this test, the more difficult it was to rip of the protection layer 5 indicated a longer the life of the sensor element 1.

The determination criteria was 'Excellent, E' in a case of repeatedly performing heating and cooling for 4000 times or more, without ripping the protection layer 5 from the sensor element 1 occurring, 'Good, G' in a in a case of 2000 times or more and less than 4000 times, and 'Poor, P' in a case of less than 2000 times, without ripping of the protection layer 5 therefrom.

As shown in FIG. 1, it was found that the larger the open percentage A2/A1, the more difficult it was for the protection layer to be ripped. The evaluation results were either 'Excellent, E, or Good, G'.

(Continuous Durability in High Temperatures)

A confirmation test for continuous durability in high temperatures was performed by testing changes of an inner resistance value of the sensor element 1 with time. The changes described refer to changes of the inner resistance value of the sensor element 1 which were due to thermal aggregation. In the confirmation test, the samples of the sensor element 1 were continuously exposed to a high temperature of 700° C., in atmospheric air. The gas sensors 10 are each provided with the sample which were mounted on an exhaust pipe of an engine, and the inner resistance values of the samples were measured.

The inner resistance value was measured as a resistance value between the measuring electrode 3 via the solid electrolyte body 2 and the reference electrode 4. The inner resistance value of each sample indicates that the smaller the value is the lower the occurrence of the thermal aggregation, that is, the thermal aggregation on the measuring electrode 3 occurs with more difficulty. The lower value of inner resistance also indicates enhanced thermal durability of the sensor element 1. In this case, the determination criteria is 'Excellent, E' for an inner resistance value of less than 20KΩ, 'Good, G' for an inner resistance value of 20 KΩ or more and less than 90 KΩ, and 'Poor, P' for an inner resistance value of 90 KΩ or more.

As shown in Table1, when the open percentage A2/A1 is 4.9% or more, the inner resistance of the samples decreased and the evaluation result was either 'Excellent, E' or 'Good, G'. In contrast, when the open percentage A2/A1 was 4.9% or less, the inner resistance of the samples increased was marked as 'Poor, P'. As a result, the open percentage A2/A1 is preferably 5.0% or more to provide margin error, in order to maintain a low inner resistance value of the sensor element 1.

From the results described herein above, an optimum range of the open percentage A2/A1 is preferably 5.0 to 30.0%, based on the result of the electrical resistance confirmation test, were a difference in the open percentage A2/A1 largely effects the electrical resistance, and the results of the continuous high temperature durability confirmation test.

It was a found that by providing the open percentage A2/A1 in a range of 5% to 30%, the performance of the electrical resistance of the sensor element 1, the sensor output, the joining of the protection layer, and the continuous high temperature durability test were enhanced. That is, the performance of each of the above mentioned features was enhanced. Additionally, the open percentage is more preferably in a range of 10.0 to 20.0% which was marked as 'Excellent' for the 4 confirmation tests described above, in order to further enhance the performances of the above mention features. It is noted that, this range of 10% to 20% is determined from an actual range of 9.9% to 20.2% to provide margin error.

It is to be understood that, the present disclosure is described in accordance with the embodiments, however, not limited to the above described. That is, the present disclosure includes various modified examples and modifications within the equivalent ranges. In addition, various combinations and modes which include a combination of one element, more than one element or less than one element are included within category and the scope of the disclosure.

What is claimed is:

1. A gas sensor for measuring a gas concentration comprising;
    a sensor element;
    the sensor element comprising
    a solid electrolyte body which is formed from an oxygen-ion conductive ceramic, the solid electrode body being configured in a tube shape provided with a bottom, and having a tube portion and a closed portion closing a tip end of the tube portion;
    a measuring electrode provided on at least an outer surface of the tube portion and exposed to a measured gas, and
    a protection layer which is formed from a porous ceramic covering a surface of the measuring electrode and has a first protection layer covering a surface of the measuring electrode, a second protection layer covering a surface of the first protection layer, and a third protection layer which covers a surface of the second protection layer; wherein, on the measuring electrode, a plurality of opening portions are formed which penetrate through the measuring electrode;

the solid electrode body has a plurality convex portions formed on the outer surface and arranged inside the opening portions, the solid electrode body and the protection layer are joined to each other via the plurality of opening portions, and the convex portions are configured to protrude from the opening portions and be in contact with the first protection layer, and a percentage of an open area is 5.0% or more and 30.0% less, relative to an outer area, when, the open area is a total area on which the plurality of opening portions are formed, with the measuring electrode laid open on a plane surface, and the outer area is a total outer area of the measuring electrode, with the measuring electrode laid open on the plane surface.

2. The gas sensor according to claim 1, wherein the percentage of the open area is 10.0% or more and 20.0% or less, relative to the outer area.

3. The gas sensor according to claim 2, wherein the plurality of the opening portions have an average diameter of 10 μm or more and 150 μm or less.

4. The gas sensor according to claim 1, wherein the plurality of the opening portions have an average diameter of 10 μm or more and 150 μm or less.

5. The gas sensor according to claim 1, wherein the first protection layer is formed of a metal oxide substance which has, as a main substance, at least one of alumina ($Al_2O_3$) or magnesium aluminate spinel ($MgAl_2O_4$).

6. The gas sensor according to claim 5, wherein the plurality of the opening portions have an average diameter of 10 μm or more and 150 μm or less.

7. The gas sensor according to claim 1, the second protection layer is formed of a metal oxide substance which has, as a main substance, at least one metal among alumina, magnesium aluminate spinel, zirconia, a partially stabilized zirconia and stable zirconia, and at least one noble metal catalyst among Pt, Rh, Pd and Ru (ruthenium) and, the third protection layer is formed of a metal oxide which has at least one type of metal among alumina, magnesium aluminate spinel, and titania, as a main substance.

* * * * *